(12) United States Patent
Singh et al.

(10) Patent No.: US 11,379,193 B2
(45) Date of Patent: Jul. 5, 2022

(54) SYSTEMATIC AUDIO-VISUAL AND CONTROL SYSTEM DESIGN TOOL

(71) Applicant: XTEN-AV, LLC, Union City, CA (US)

(72) Inventors: Vibhav Singh, Delhi (IN); Sahil Dhingra, Hayward, CA (US)

(*) Notice: Subject to any disclaimer, the term of this patent is extended or adjusted under 35 U.S.C. 154(b) by 341 days.

(21) Appl. No.: 16/679,163

(22) Filed: Nov. 9, 2019

(65) Prior Publication Data
US 2020/0150936 A1 May 14, 2020

Related U.S. Application Data

(60) Provisional application No. 62/758,587, filed on Nov. 11, 2018.

(51) Int. Cl.
*G06F 8/38* (2018.01)
*G06Q 10/04* (2012.01)

(52) U.S. Cl.
CPC .............. *G06F 8/38* (2013.01); *G06Q 10/043* (2013.01)

(58) Field of Classification Search
CPC ................................ G06F 8/38; G06Q 10/043
USPC .................................................... 700/90–107
See application file for complete search history.

(56) References Cited

U.S. PATENT DOCUMENTS

| | | |
|---|---|---|
| 5,895,477 A | 4/1999 | Orr et al. |
| 2008/0263469 A1 | 10/2008 | Nasle et al. |
| 2010/0318917 A1* | 12/2010 | Holladay ............ H04L 41/0893 715/735 |
| 2011/0173235 A1* | 7/2011 | Aman ................. G06K 9/00342 707/792 |
| 2013/0264396 A1* | 10/2013 | Roe ........................... A61L 9/12 239/11 |
| 2015/0062334 A1* | 3/2015 | Dickinson .......... G06Q 30/0251 348/143 |
| 2016/0180016 A1* | 6/2016 | Schafer .................. H05B 47/19 703/17 |

OTHER PUBLICATIONS

Zeng, Zhihong, et al. "A survey of affect recognition methods: Audio, visual, and spontaneous expressions." IEEE transactions on pattern analysis and machine intelligence 31.1 (2008): pp. 39-58. (Year: 2008).*

(Continued)

*Primary Examiner* — Satish Rampuria
(74) *Attorney, Agent, or Firm* — Keith L. Jenkins, Registered Patent Attorney, LLC; Keith L Jenkins

(57) ABSTRACT

A computer-based tool having a at least one computer program having access to at least one database containing images, descriptions, specifications, and connectivity data for a plurality of audio-visual and audio-visual control products and further having a user interface for interactively accessing the at least one database. In response to queries from the computer-based tool, the user makes initiates actions and makes choices regarding the physical venue and the products needed. The tool responsively produces a bill of materials, a cable schedule, a rack layout, a user-editable audio-visual connectivity line schematic, and a ceiling speaker layout. The at least one database and the at least one computer program may be centralized or distributed, and may include PCs, mainframes, servers, cloud-based resources, and the like.

8 Claims, 10 Drawing Sheets

(56) References Cited

OTHER PUBLICATIONS

Friard, Olivier, and Marco Gamba. "BORIS: a free, versatile open-source event-logging software for video/audio coding and live observations." Methods in ecology and evolution 7.11 (2016): pp. 1325-1330. (Year: 2016).*

Mitola, Joseph. "Software radios: Survey, critical evaluation and future directions." IEEE Aerospace and Electronic Systems Magazine 8.4 (1993): pp. 25-36. (Year: 1993).*

Han, Dae-Man, and Jae-Hyun Lim. "Design and implementation of smart home energy management systems based on zigbee." IEEE Transactions on Consumer Electronics 56.3 (2010): pp. 1417-1425. (Year: 2010).*

Leveson, Nancy G., et al. "Requirements specification for process-control systems." IEEE transactions on software engineering 20.9 (1994): pp. 684-707. (Year: 1994).*

Li, Qing, and Caroline Yao. Real-time concepts for embedded systems. CRC press, 2003.pp. 1-67 (Year: 2003).*

* cited by examiner

FIG. 5

Google Flobrido / Sundar Pichai's Meeting Room / Bill of Material

Bill of Material - Sundar Pichai's Meeting Room

| S.NO | DESCRIPTION | BRAND | MODEL | QUANTITY | UNIT PRICE(USD) | AMOUNT(USD) |
|---|---|---|---|---|---|---|
| 1 | 98 4K Display with HDBT compatibility | Panasonic | Panasonic TH-98LQ70L | 2 | $28,149.00 | $56,298.00 |
| 2 | 108 (16:9) Standard tab-tensioned motorized screen | Vutec | Vutec L3533-9480 | 1 | $0.00 | $0.00 |
| 3 | Versatile Portable Projector with High Brightness | Vivitek | Vivitek DS262 | 1 | $160.00 | $160.00 |
| 4 | SX80 Codec with precision series camera support | Cisco | Cisco SX80 | 1 | $17,900.00 | $17,900.00 |
| 5 | Precision 60 Camera with 20x zoom | Cisco | Cisco Precision 60 Camera | 2 | $8,900.00 | $17,800.00 |

XLS   PDF   EDIT BOM

FIG. 8

Facebook new HQ / Marks Meeting Room / Cable Schedule — 802

Cable Schedule - Marks Meeting Room

| S/NO CABLE ID | SOURCE DEVICE | DESTINATION DEVICE | SOURCE PORT | DESTINATION PORT | CABLE TYPE | SIGNAL TYPE |
|---|---|---|---|---|---|---|
| 1 HD1-1001 | Laptop | Kramer WP-20 | HDMI OP | HDMI IP1 | HDMI | Video |
| 2 LN1-1002 | Kramer WP-20 | Kramer VS-88UT | LAN OP | LAN IP1 | CATx | Video |
| 3 LN2-1003 | LAN Network | Kramer VIA Campus | LAN | LAN1 | CATx | Video |
| 4 HD2-1004 | Wireless presentation System | Kramer VS-88UT | HDMI OP | HDMI IP1 | HDMI | Video |
| 5 HD3-1005 | Desktop | Kramer VS-88UT | HDMI OP | HDMI IP2 | HDMI | Video |
| 6 HD4-1006 | Desktop | Kramer VS-88UT | HDMI OP | HDMI IP3 | HDMI | Video |

SYSTEMATIC AUDIO-VISUAL AND CONTROL SYSTEM DESIGN TOOL

RELATIONSHIP TO OTHER APPLICATIONS

This application claims the benefit of U.S. provisional patent Ser. No. 62/758,587 filed 11 Nov. 2018 to at least one common inventor.

FIELD OF ART

The present invention relates to a system and method to develop computer-based SAAS (Software as a Service) tool for audio-visual and audio-visual control system designs by creating a bill of materials, automated user-editable audio-visual connectivity line schematics, rack layouts, cable schedules, and ceiling speaker layouts.

BACKGROUND OF THE INVENTION

Any discussion of documents, acts, materials, devices, articles or the like which has been included in this specification is solely for the purpose of providing a context for the present invention. It is not to be taken as an admission that any or all of these matters form a part of the prior art base or were common general knowledge in the field relevant to the present invention as it existed in the United States of America or elsewhere before the priority date of this application.

Complexity kills the game irrespective of the business industry. In the audio-visual industry, the overall arrangement of various audio-visual components or equipment is a tedious task with manual inputs and labor making it an exhausting and daunting task to accomplish. Thinking on the lines of one stop solution to solve the current problem of complexity in the arrangement and management of various audio-visual components, the present invention aims at devising a method and a system for audio-visual and control system by responsively creating a bill of materials. automated audio-visual connectivity line schematics, rack layouts, cable schedules, and ceiling speaker layouts.

U.S. Pat. No. 5,895,477A to Orr et al. (1999) discloses a method to add content to a composition having a chosen design and automatically calculates a layout for the composition. However, the invention focuses on automatically calculating the layout of compositions. On the contrary, the present invention does not focus on the layout of laid components rather it focusses on connectivity of various audio-visual devices. In the present invention, the schematic layout of the drawing is not dependent on the type of design selected but actually dependent on the devices the user selects.

US Patent Application US20080263469A1 to Nasle et al. (2008) discloses a system for automatically generating a schematic of a user interface of an electrical system. The system includes a data acquisition component, a power analytics server and a client terminal. The data acquisition component acquires real-time data output from the electrical system. The power analytics server is comprised of a virtual system modeling engine, an analytics engine, a machine learning engine and a schematic user interface creator engine. However, Nasle's application focusses on electrical power systems wherein real time data of electrical components to their server is analyzed to make line schematics. These schematics predict the real-time health and performance of electrical system. Nasle's application is not relevant to audio-visual industry and is more focused on analysis and finding performance of the electrical systems for predicting their future.

After a thorough study of the aforesaid documents and more related ones, there is a need to develop and design a system that would address one or more drawbacks or insufficiencies of such systems and methods, thereby limiting their practical applications. The abovementioned problems leads to the current invention for the development of a systematic audio-visual and control system design tool for audio-visual systems.

AVIXA is a standard-setting organization for the audio-visual industry.

SUMMARY OF THE INVENTION

It is an object of the present invention to overcome, or substantially ameliorate, one or more of the disadvantages of the prior art, or to provide a useful alternative.

According to an aspect of the present invention; there is provided a method and system to develop audio-visual and control system design by calculating specifications of audio, video and control components or products and thereby creating bill of materials and automated audio-visual connectivity line schematics or equipment connectivity drawings, equipment rack layouts, cable schedules or cable labelling details, and ceiling speaker layouts (including coverage pattern and placement of speakers in the ceiling).

According to yet another aspect of present invention, user provides parameters like the type of room, room dimensions, seating capacity and other functional audio-visual and control requirements of the room. Based on user inputs, the system performs intricate calculations to the required specification of each individual component of audio, visual and control system.

According to yet another aspect of present invention, the system searches the best matching products from a database of various audio and visual products and subsequently matches products to user specifications and matching products are shown to the user to be added to the bill of materials.

According to another aspect of present invention, the system automatically generates audio-visual connectivity line schematics or equipment connectivity drawings, equipment rack layout, cable schedule (cable labelling and cable type and connectivity details), and ceiling speaker layout (coverage pattern and placement of speakers in ceiling).

The features and advantages of the present invention will become further apparent from the following detailed description of preferred embodiments, provided by way of example only, together with the accompanying drawings.

DESCRIPTION OF THE FIGURES OF THE DRAWINGS

The present invention will hereinafter be described in conjunction with the following drawing figures, wherein like numerals denote like elements.

FIG. 5 is a screenshot view illustrating an exemplary bill of materials of the exemplary embodiment of the systematic audio-visual and control system design tool of FIG. 1A-B, according to a preferred embodiment of the present invention;

FIG. 8 is a screenshot view illustrating an exemplary cable schedule of the exemplary embodiment of the systematic audio-visual and control system design tool of FIG. 1A-B, according to a preferred embodiment of the present invention.

DETAILED DESCRIPTION OF THE INVENTION

Figure 1A:
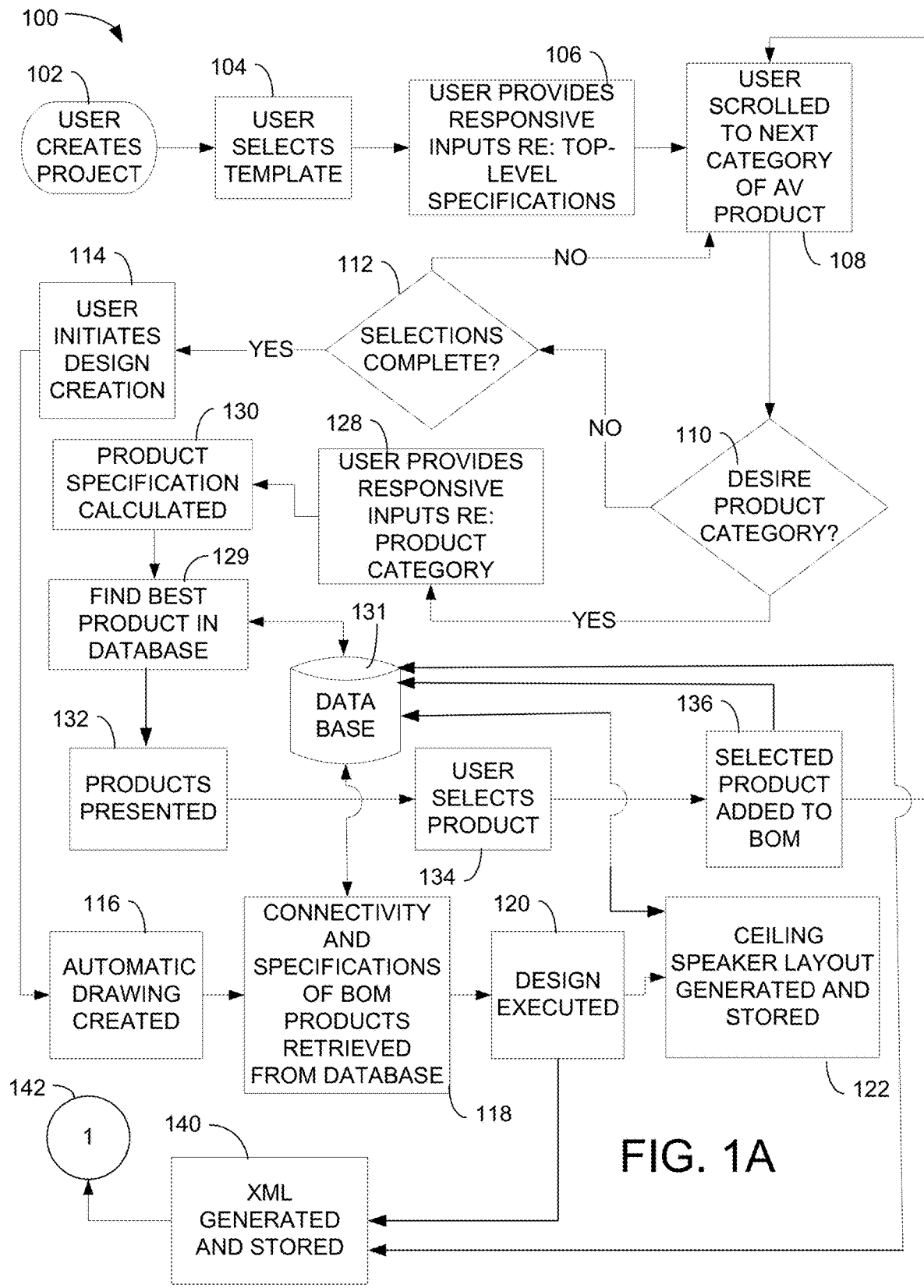
FIG. 1A is a first page of a flowchart view illustrating an exemplary embodiment of the systematic audio-visual and control system design tool, according to a preferred embodiment of the present invention.

In the drawings, the hundreds digit refers to the figure number of the drawing in which the referenced item was first discussed.

FIG. 1A is a first page of a flowchart view illustrating an exemplary embodiment of the systematic audio-visual and control system design tool 100, according to a preferred embodiment of the present invention. The systematic audio-visual and control system design tool 100 (hereinafter "the tool") presents a user interface by which the user creates a project in step 102. The tool 100 then presents a plurality of selectable design templates (meeting room, classroom, auditorium, network rooms, conference room, theater, open office, etc.) from which the user then selects a design template in step 104. The tool 100 then presents a series of questions based on AVIXA standards and related to the selected venue template. These questions includes type of room, room dimensions, seating capacity and other functional audio-visual and control requirements of the room. The question are based on standards laid by AVIXA (the trade association representing the professional audiovisual and information communication industries worldwide). Every design template has a different set of questions which vary according to the purpose of that room.

The user answers the specific questions regarding the particular venue in step 106. The tool 100 then presents the user with a category of audio visual and control products in step 108. The tool 100 presents the user a choice as to whether the user wants a particular category of product in step 110. The tool 100 then shows various categories of audio visual and control products which the user has a choice to select according to his needs. If user indicates a choice of a particular category of product, the questions related to the chosen category of products are shown to the user. The HTML5, CSS3, and Javascript technology which runs in web browsers are used to show a user interface which helps users to make these various selections. Additionally Jquery (A javascript library) is used on frontend to hide and show various dynamic options to the user. If the user indicates the affirmative in step 110, the queries based on AVIXA standards and related to the desired category of products are shown to the user and the user makes choices in step 128. Depending on the various choices made by the user for that category of product, a Rest API written in Python language running on a server, preferably a cloud server, receives user's input. In step 130, based on the category of product & choices made by the user, a service then calculates the specification for that product and then, in step 129, finds most appropriate matching product by looking into Postgres database 131 preferably running on cloud. The Postgres database 131 is essentially a collection of tables which have detailed information about audio visual and control products. This information includes description, model number, price, port information and technical specification about audio visual and control products. This service for product selection uses AVIXA standards according to the user preferences along with mathematical and physical calculations leading to the best selection of the products from the large number of products available in Postgres database 131. If the service is able to find the best matching product, it then sends the resulting data back to frontend in JavaScript Object Notation (JSON) format. JSON (JavaScript Object Notation) is a lightweight data-interchange format. It is easy for machines to read and generate.

In some particular embodiments, a local, dedicated, or discrete database 131 may be used. Database 131 may be singular or may be a plurality of databases 131 and either be local, distributed, or cloud-based in various embodiments. The Javascript code running in user's system receives the JSON generated by backend services and interprets it. After data is interpreted it populates the data in human readable format. In step 132, the tool 100 presents to the user images and information about the products found in the database search 129. A pool of matched products is displayed for selection by the end user, who makes a final product selection in step 134. After user chooses the product, a frontend service running in javascript sends data using AJAX to a backend service which receives the data and saves it to the Ppostgres database 131, preferably running on cloud. At any point the user can refresh the page and change selections if needed. The tool uses AJAX (Asynchronous JavaScript and XML) on frontend. AJAX allows web pages to be updated by exchanging small amounts of data with the server behind the scenes. This means that it is possible to update parts of a web page, without reloading the whole page.

In step 136, the tool adds the selected product to the bill of materials (BOM). After the products gets added to bill of material, the tool 100 transfers control to the next category of product. The tool 100 then transfers control back to step 108 where the user is presented with the next category of products. A rejection loop is created by steps 108 to 110 to 112 to 108. An acceptance loop is created by steps 108 to 110 to 128 to 130 to 129 to 132 to 134 to 136 to 108. Both loops exit from step 112 into step 114.

If the user indicates the negative in step 110, the tool 100 queries the user in step 112 as to whether or not all selections in all product categories are complete. If not, the tool 100 transfers control back to step 108 where the user is presented with the next category of products. If the tool 100 receives an affirmative response to query step 112, the tool 100 enables the user to initiate creation of the design in step 114 by, for non-limiting example, clicking on a "generate design" icon, causing the logic of connectivity between individual audio, video and control equipment with various permutation and combination about individual ports of each product in the BOM to be fetched from the database 131 in step 118 and the design is then executed in step 120. After "Generate Design" button is clicked, A request is sent to Python code on server which fires up a service and retrieves equipment connectivity data and products data associated with the products added by the user in the bill of material. The logic of connectivity between individual audio, video and control equipment along with various permutations and combinations of connectivity is then executed and then retrieved for each individual product in the bill of material chosen by the user and this consolidated information is then utilized to create an XML (Extensible Markup Language).

In case user also has ceiling speakers in bill of material, a service also calculates ceiling speaker layout in step 122. This service calculates the number of speakers and its placement by using various physics and mathematical formulas laid by AVIXA. Various parameters like height of room, length of room, floor material, acoustics, etc. are used by this service to calculate the best placement of speakers. Data generated from ceiling speaker layout service is then saved in Postgres database 131. In step 140 the remainder of the design is generated as XML, which is compressed and encrypted using BASE64 encryption and then stored to Postgres database 131, preferably on the cloud server. Page connector 142 shows the entry point for FIG. 1B.

Figure 1B:
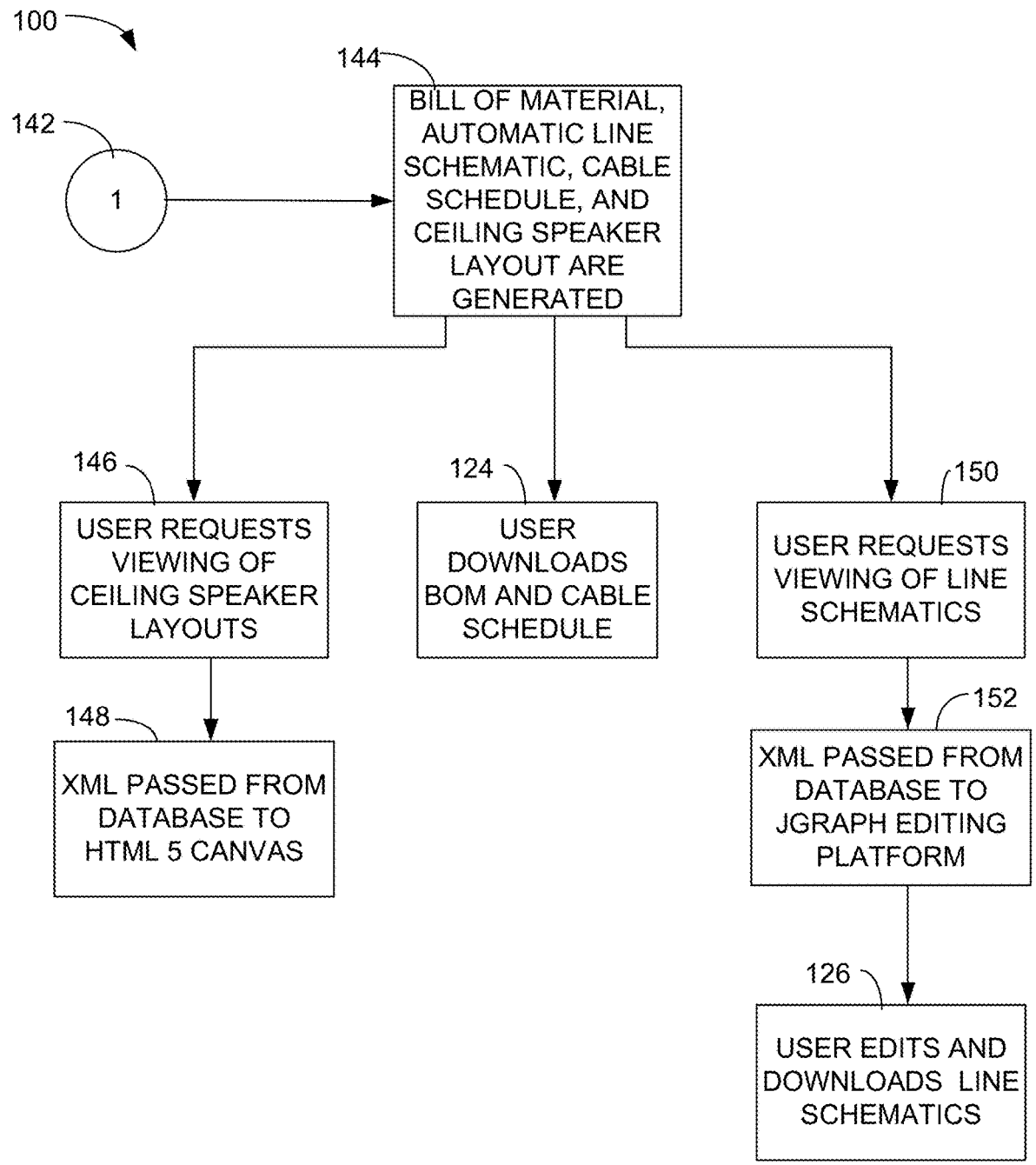
FIG. 1B is a second page of the flowchart view illustrating an exemplary embodiment of the systematic audio-visual and control system design tool of FIG. 1A, according to a preferred embodiment of the present invention.

FIG. 1B is a second page of the flowchart view illustrating an exemplary embodiment of the systematic audio-visual and control system design tool of FIG. 1A, according to a preferred embodiment of the present invention. In step 144, the bill of material 500 (see FIG. 5), automatic audio-visual connectivity line schematic 600 (see FIG. 6), rack layout 700 (see FIG. 7), cable schedule 800 (see FIG. 8) and ceiling speaker layout 900 (see FIG. 9) are generated automatically. After drawing file is compressed & encrypted, it is successfully saved in Postgres database 131, preferably running on cloud after which the user has options to view various documents. The documents include the bill of materials 500, automated user-editable audio-visual connectivity line schematic 600, rack layout 700, cable schedule 800, and ceiling speaker layout 900. When user requests one of these documents, a request is made to Python code which further sends requests to Postgres database to fetch the required document. The data sent back by Python code is then rendered in user's browser with the help of frontend technologies HTML5, CSS3, and Javascript. The user also has an option to view ceiling speaker layouts 900 if there is a ceiling speaker in the bill of material 500. The ceiling speaker layout 900 includes placement of speakers in the ceiling based on the coverage pattern and coverage angle of the speaker selected by the user. Once user clicks on "View Ceiling speaker layout" in step 146, the XML saved in Postgres database 131 is decrypted. In step 148, XML data is then transferred from Python to Javascript which uses an HTML 5 canvas to create and display a downloadable ceiling speaker layout 900.

In step 124, the user downloads the BOM 500 and the cable schedule 800 generated n step 144. The user can download these documents in Excel and PDF format.

In step 150, the user requests viewing the audio-visual connectivity line schematic 600 by, for non-limiting example, clicking on a "View line schematics" icon. This click sends a request to Postgres database 131, preferably on the cloud, requesting the XML. This XML is then passed, in step 152, to a drawing editing platform which runs on JGraph which then renders generated audio-visual connectivity line schematics, which user can also edit & download in step 126. JGraph is a graph drawing open source library. With the help of JGraph, the XML is converted to interactive graph and charting and various types of schematic diagrams. The generated audio-visual connectivity line schematics 600 are then shown to the user. The user has the ability to view these line schematics either in AVIXA certified symbols or platform generated symbols. Additionally, in edit mode, user can download generated audio-visual connectivity line schematics 600 in various formats like pdf, png, jpeg, svg, visio, and autocad.

Figure 2:
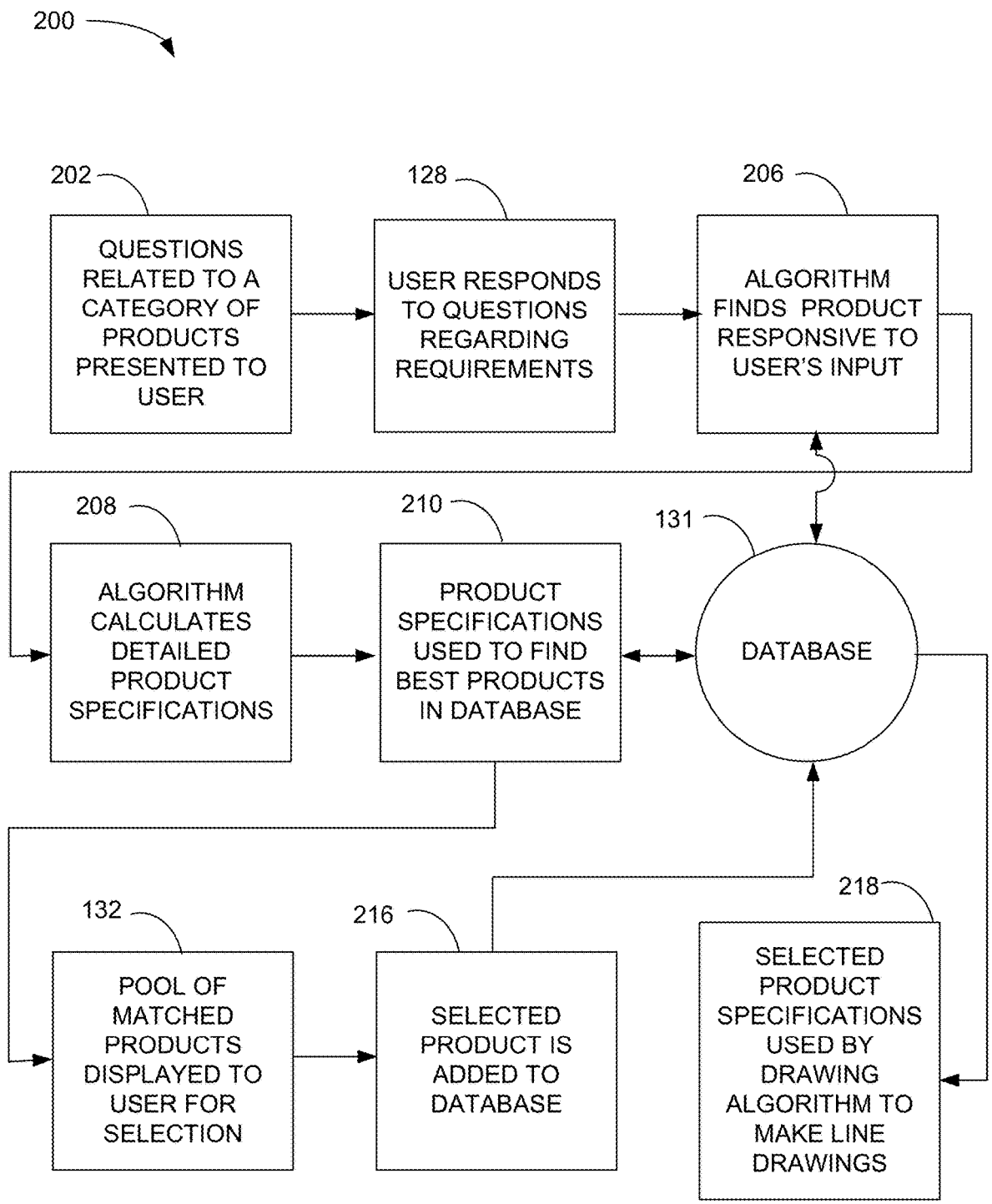
FIG. 2 is a diagrammatic illustrating an exemplary embodiment of an automatic audi-visual connectivity line schematic design process of the systematic audio-visual and control system design tool of FIG. 1A-B, according to a preferred embodiment of the present invention.

FIG. 2 is a diagrammatic view illustrating an exemplary embodiment of an audio-visual product selection process 200 of a systematic audio-visual and control system design tool 100 of FIG. 1A-B, according to a preferred embodiment of the present invention. FIG. 2 is a more detailed illustration of the tool 100 from the "YES" output of step 110 to step 122. Tool 100 presents questions related to a desired category of products to the user in step 202. In step 128, the tool 100 receives the user's answers to the questions presented in step 202 related to the desired category of audio-visual products. The tool 100 receives user provided information regarding room related information such as the type of room, room dimensions, seating capacity and other functional audio-visual and control requirements of the room in step 128. In step 206, based on the category of product, the tool 100 selects the most appropriate audio-visual products based on the specifications given by the user in step 128. The algorithm for product selection used in step 206 uses AVIXA standards and mathematical and physical calculations leading to the best selection of the products from the product database 131. In step 208, the tool 100 calculates detailed product specifications for the selected products from step 206. In step 210, the tool uses an algorithm to find the most appropriate products from database 131. A pool of matched products is displayed for selection by the end user, who makes a final product selection in step 132. The product selected by the user is added to the database 131 to be used to make automatic audio-visual connectivity line schematic in step 218. The tool's 100 algorithms then search the best matching product from database 131 of audio, video, and control products and the matching products are shown to the user to be selected 134 and added 136 to the bill of materials.

Figure 3:
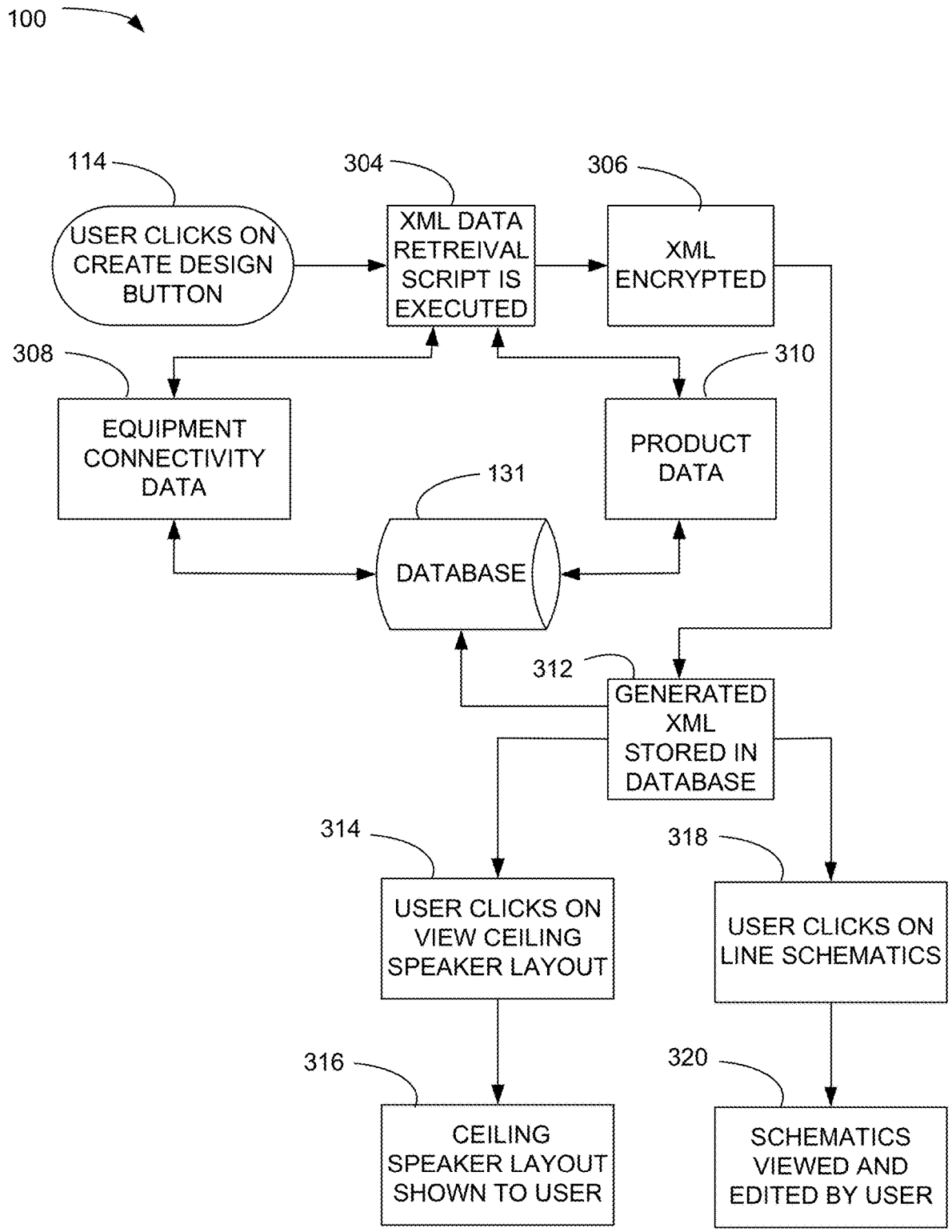
FIG. 3 is a diagrammatic view illustrating an exemplary embodiment of an audio-visual product selection process of a systematic audio-visual and control system design tool of FIG. 1A-B, according to a preferred embodiment of the present invention.

FIG. 3 is a diagrammatic illustrating an exemplary embodiment of an automatic audio-visual connectivity line schematic design process 300 of the systematic audio-visual and control system design tool 100 of FIG. 1A-B, according to a preferred embodiment of the present invention. FIG. 3 illustrates the tool 100 from step 114 through step 126. Once the tool 100 receives user input to create design in step 114, an XML retrieval script is executed in step 304. The XML script retrieves equipment connectivity data 308 and product data 310 from database 131. For non-limiting example, information about individual ports and specifications of each product selected in the bill of material is fetched from the database 131. XML generated from step 304, including data structures, is then encrypted using BASE64 encryption in step 306 and stored in database 131 in step 312. In step 318 the tool 100 responds to the user clicking on "view line schematics" causing the XML to be decrypted and passed through a drawing editing platform which runs on a JGRAPH open source library. The audio-visual connectivity line schematics are then viewed and edited by the user in step 320. In step 314 the tool 100 responds to the user clicking on "view ceiling speaker layout" causing the XML to be decrypted and an algorithm for ceiling speaker calculation transfers the information to javascript which utilizes an HTML 5 canvas to create a ceiling speaker layout 900 (see FIG. 9). An exemplary ceiling speaker layout 900 is presented in FIG. 9. The ceiling speaker layout 900 is then shown to the user in step 316.

Figure 4:
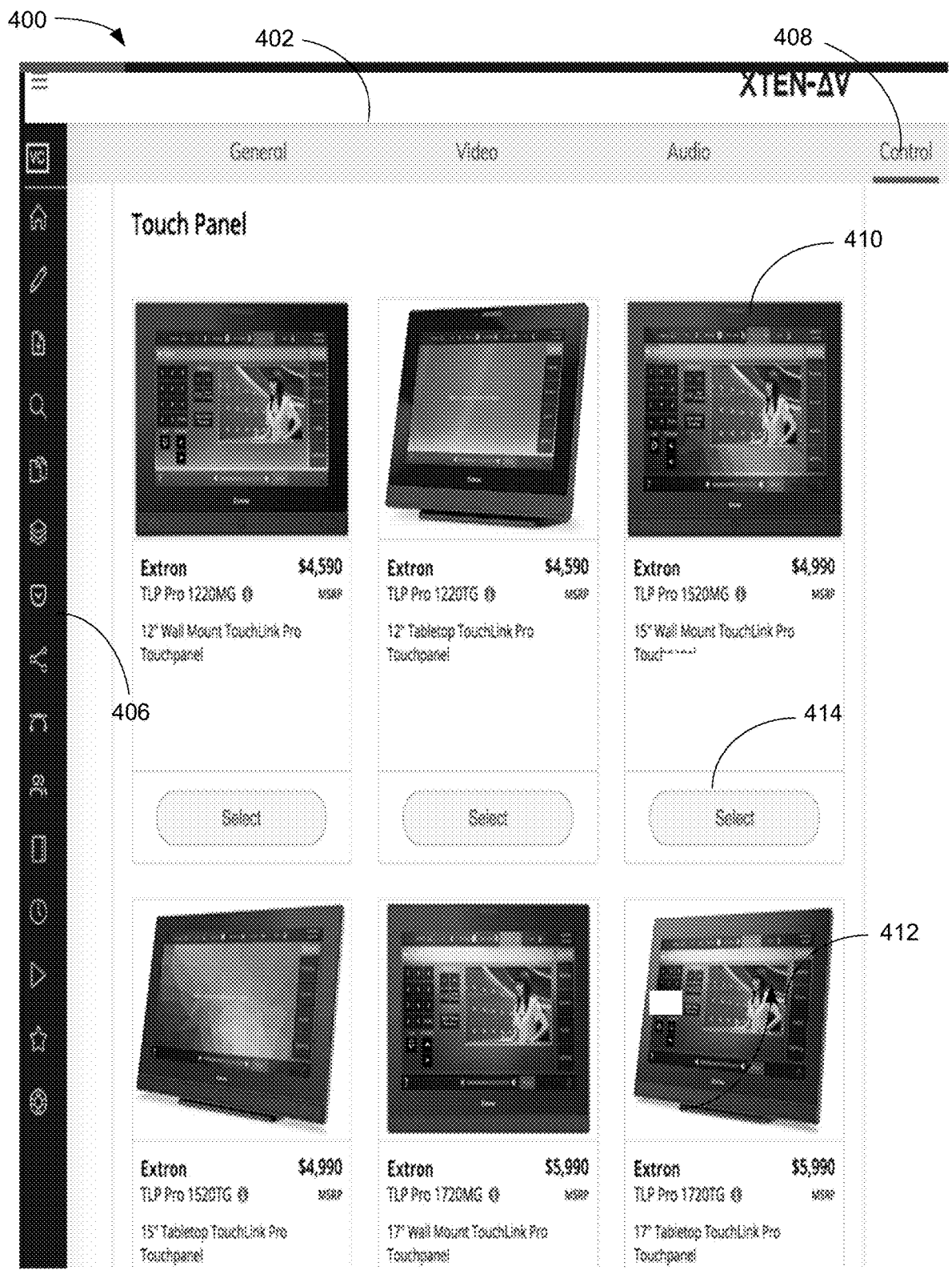
FIG. 4 is a screenshot view illustrating an exemplary user interface for product election of the exemplary embodiment of the systematic audio-visual and control system design tool of FIG. 1A-B, according to a preferred embodiment of the present invention.

FIG. 4 is a screenshot view illustrating an exemplary user interface for product selection 400 of the exemplary embodiment of the systematic audio-visual and control system design tool 100 of FIG. 1A-B, according to a preferred embodiment of the present invention. The user interface 400 includes a top menu 402 for tool 100 functions, a scrollable product display area 404, and a side menu 406 for computer functions. Top menu 402 includes selection icons 408 (one of four visible of six labeled) entitled General, Video, Audio, Control, Bill of materials, and Calculations, respectively. Exemplary product display area 404 shows six selectable images of control stations 410 (one of three labeled) and 412 (one of three labeled). Selection icons 414 (one of three labeled) are user-selectable to add a product to the BOM. Exemplary user interface 400, as shown, is used to accomplish steps 134 and 136.

FIG. 5 is a screenshot view illustrating an exemplary user interface for the bill of materials 500 of the exemplary embodiment of the systematic audio-visual and control system design tool 100 of FIG. 1A-B, according to a preferred embodiment of the present invention. The display of BOM 500 includes a title 502, a header bar 504, a side menu 406 for computer functions, and a scrollable columnar data display area 520. Header bar 504 includes column headings, including Description 506, Brand 508, Model 510, Quantity 512, Unit price 514, and Amount 516. Exemplary user interface for the BOM 500, as shown, is displayed in step 124.

Figure 6:
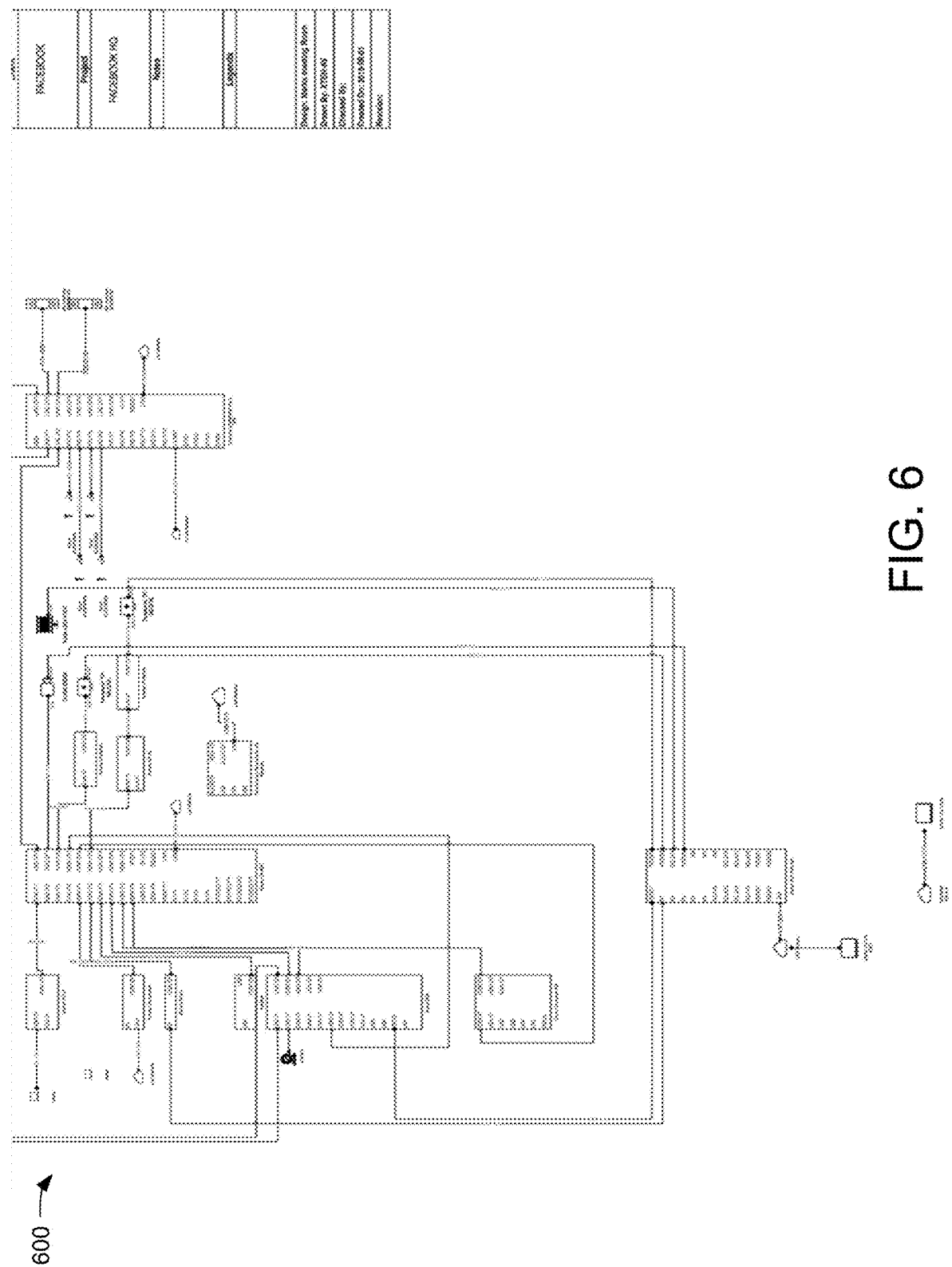
FIG. 6 is a screenshot view illustrating an exemplary audio-visual connectivity line schematic of the exemplary embodiment of the systematic audio-visual and control system design tool of FIG. 1A-B according to a preferred embodiment of the present invention.

FIG. 6 is a screenshot view illustrating an exemplary audio-visual connectivity line schematic 600 of the exemplary embodiment of the systematic audio-visual and control system design tool 100 of FIG. 1A-B, according to a preferred embodiment of the present invention. The image in FIG. 6 is not presented for the text labels on the schematic, but only to show that a complex audio-visual connectivity line schematic can be produced in step 152 and displayed in step 126.

Figure 7:
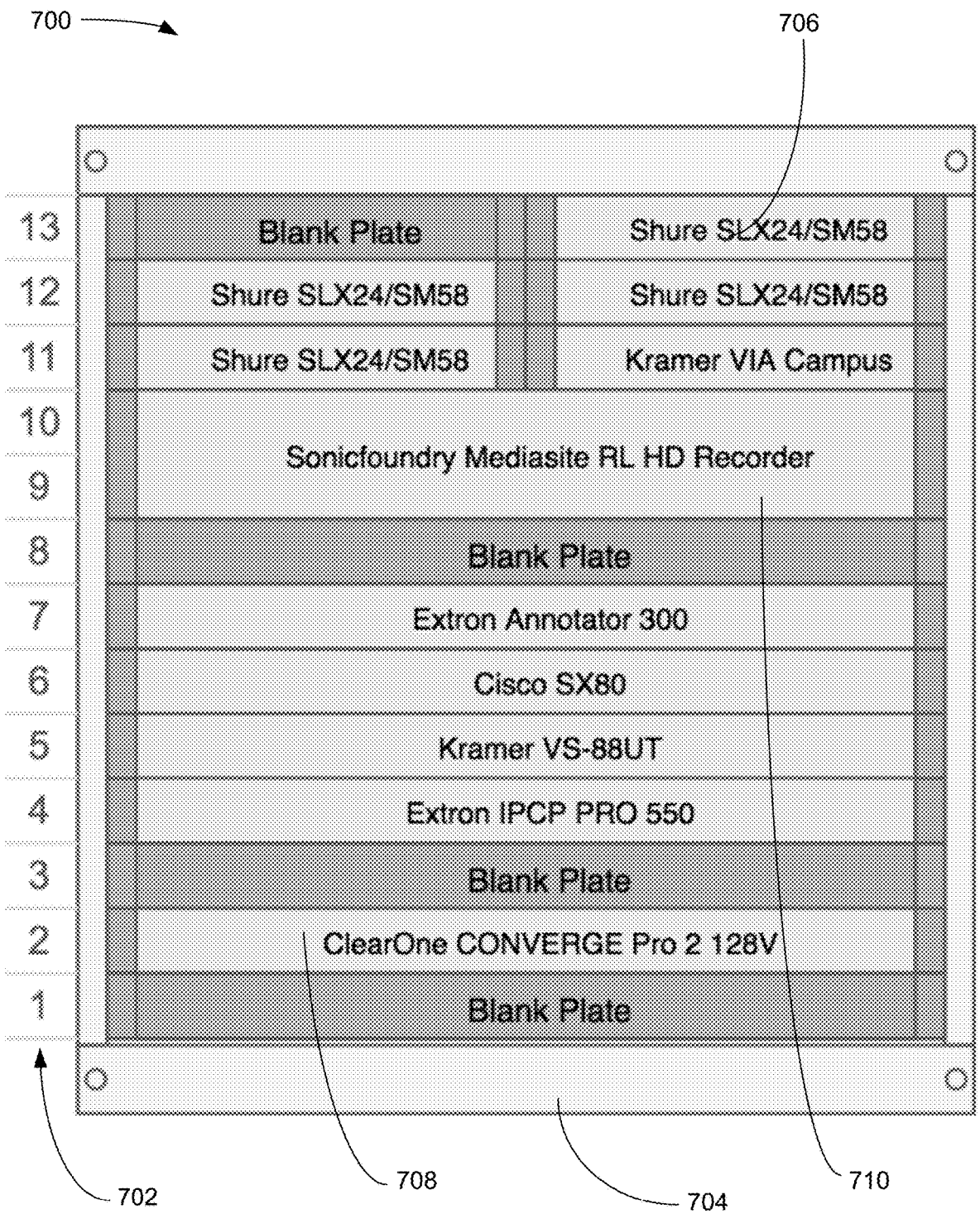
FIG. 7 is a screenshot view illustrating an exemplary rack layout of the exemplary embodiment of the systematic audio-visual and control system design tool of FIG. 1A-B, according to a preferred embodiment of the present invention.

FIG. 7 is a screenshot view illustrating an exemplary rack layout 700 of the exemplary embodiment of the systematic audio-visual and control system design tool 100 of FIG. 1A-B, according to a preferred embodiment of the present invention. Rack layout 700 includes a slot index 702, a frame 704, five half-width rack modules 706 (one of five labeled), and six full-width rack modules 708 (one of four labeled), of which one is a double-height rack module 710. Each rack module 706, 708, and 710 is labeled with a product name, as shown. The rack layout is displayed in step 126.

FIG. 8 is a screenshot view illustrating an exemplary cable schedule 800 of the exemplary embodiment of the systematic audio-visual and control system design tool 100 of FIG. 1A-B, according to a preferred embodiment of the present invention. Cable schedule 800 includes a title 802, a header bar 804, a side menu 406 for computer functions, and a scrollable columnar data display area 822. Header bar 804 includes column headings, including serial number 806, cable id 808, source device 810, destination device 812, source port 814, destination port 816, cable type 818, and signal type 820. Exemplary user interface for the cable schedule 800 is displayed in step 124, as shown.

Figure 9:
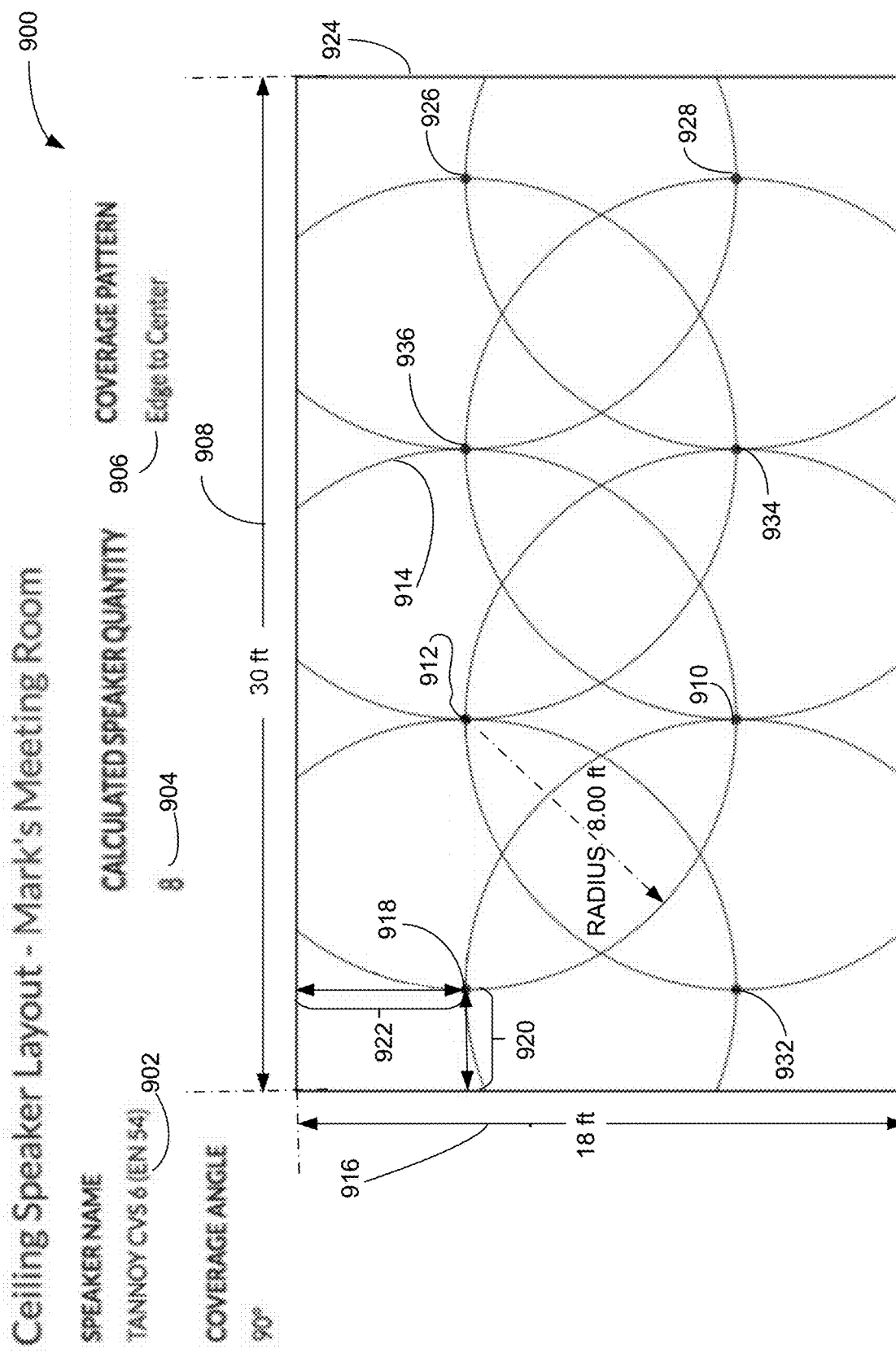
FIG. 9 is a screenshot view illustrating an exemplary ceiling speaker layout of the exemplary embodiment of the systematic audio-visual and control system design tool of FIG. 1A-B, according to a preferred embodiment of the present invention.

FIG. 9 is a screenshot view illustrating an exemplary ceiling speaker layout 900 of the exemplary embodiment of the systematic audio-visual and control system design tool 100 of FIG. 1A-B, according to a preferred embodiment of the present invention. The ceiling speaker layout 900 includes a title 902, an indicator 904 of the number of ceiling speakers 910, 918, 926, 928, 930, and 932, a polar pattern 906, and an annotated diagram of room 924. In the exemplary case, rectangular room 924 has a width 916 of twelve feet and a length 908 of twenty-eight feet. Ceiling speakers 918, 926, 928, and 932 are positioned offset 920 five feet from the shorter ends, as shown. Ceiling speakers 910, 918, 926, 928, 930, and 932 are positioned offset 922 one-and-a-half feet from the long sides. Each ceiling speaker location 910, 912, 918, 926, 928, 934, 936, and 932, and has a coverage radius 912 of eight feet illustrated further by coverage circles 914 (one of eight labeled). Speaker locations 910, 912, 918, 926, 928, 934, 936, and 932 are symmetrically arranged, as shown, in a ceiling having a length 908 of thirty feet and a width 916 of eighteen feet. Exemplary speaker location 918 has a distance 922 from the long side of the ceiling of five feet and a distance from the short side of the ceiling of three feet. The other three corner locations 926, 928, and 932 are similarly spaced from the ceiling edges. Middle locations 910, 912, 934, and 936 are spaced equally apart between the corner locations 918, 932, 926, and 928, as shown.

While a preferred embodiment has been described, it will be appreciated by persons skilled in the art that numerous variations and/or modifications may be made to the invention without departing from the spirit or scope of the invention as broadly described. The present embodiments are, therefore to be considered in all respects as illustrative and not restrictive.

The following claims may contain functional claiming. There are no statements of intended use in the claims.

We claim:

1. A systematic audio-visual and audio-visual control system design tool executable on at least one computing device having a processor and memory comprising:
    a. a database, in communication with said at least one computing device, storing images, descriptions, specifications, and connectivity data for a plurality of audio-visual and audio-visual control products;
    b. a user interface for interactively obtaining data from said database and from a plurality of user-selectable venue templates; and
    c. a computer program operable to determine from said interactively obtained product data and from a user-selected venue template from said plurality of user-selectable venue templates, a design for an audio-visual and audio-visual control installation;
    d. wherein said computer program comprises a plurality of computer programs is operable to produce:
        i. a user-editable audio-visual connectivity line schematic responsive to said obtained data;

ii. a ceiling speaker layout responsive to said obtained data;
iii. a bill of materials responsive to said obtained data;
iv. a cable schedule responsive to said obtained data;
v. a rack layout responsive to said obtained data;
e. wherein said user interface presents said product data within a plurality of categories, wherein said plurality of categories comprises video equipment, audio equipment, and audio-visual control equipment.

2. The tool of claim 1, wherein said user interface receives: a. an indication that project creation has been initiated by a user, b. a selection of a template from a plurality of user-selectable said templates corresponding to a respective plurality of types of venues for audio-visual and audio-visual control installations; c. user responses to questions regarding top-level installation specifications; d. a user-selected category of products from said plurality of categories; e. user responses to questions regarding said selected product category; and f. a user-selected product from said selected product category.

3. The tool of claim 2, wherein said tool produces a bill of materials, a cable schedule, a rack layout, a user-editable audio-visual connectivity line schematic, and a ceiling speaker layout.

4. A systematic audio-visual and audio-visual control system design tool, executable on a plurality of computing devices each having a processor and memory, comprising:
   a. a database, in communication with at least one computing device of said plurality of computing devices, storing images, descriptions, specifications, and connectivity data for a plurality of audio-visual and audio-visual control products;
   b. a user interface for interactively obtaining product data from said database and to select a venue template from a plurality of user-selectable venue templates; and
   c. a plurality of computer programs operable to determine from said interactively obtained product data and from said user-selected venue template, a design for an audio-visual and audio-visual control installation, including a user-editable audio-visual connectivity line schematic responsive to said obtained data;
   d. wherein a computer program of said plurality of computer programs is operable, responsive to said user-selected venue template and said interactively obtained product data, to produce:
      i. a ceiling speaker layout responsive to said obtained data;
      ii. a bill of materials responsive to said interactively obtained product data;
      iii. a cable schedule responsive to said interactively obtained product data and said selected venue template;
      iv. a rack layout responsive to said interactively obtained product data;
   e. wherein said user interface presents data within a plurality of categories, wherein said plurality of categories comprises video equipment, audio equipment, and audio-visual control equipment.

5. The tool of claim 4, wherein said user interface receives: a. an indication that project creation has been initiated by a user, b. a selection of a template from a plurality of user-selectable said templates corresponding to a respective plurality of types of venues for audio-visual and audio-visual control installations; c. user responses to questions regarding top-level installation specifications; d. a user-selected category of products from said plurality of categories; e. user responses to questions regarding said selected product category; and f. a selection of said product from said selected product category.

6. The tool of claim 5, wherein said tool produces a bill of materials, a cable schedule, a rack layout, said user-editable audio-visual connectivity line schematic, and a ceiling speaker layout.

7. A systematic audio-visual and control system design tool comprising:
   a. at least one database storing images, descriptions, specifications, and connectivity data for a plurality of audio-visual and audio-visual control products;
   b. a user interface for interactively obtaining data from said database and for selecting a venue template from a plurality of venue templates; and
   c. a plurality of computer programs operable to determine from said obtained data and said selected venue template a design for an audio-visual and control installation;
   d. wherein a computer program of said plurality of computer programs is operable to produce:
      i. a user-editable audio-visual connectivity line schematic responsive to said obtained data; and
      ii. a ceiling speaker layout responsive to said obtained data;
      iii. a bill of materials responsive to said obtained data;
      iv. a cable schedule responsive to said obtained data; and
      v. a rack layout responsive to said obtained data;
   e. wherein said user interface presents data within a plurality of categories, wherein said plurality of categories comprises video equipment, audio equipment, and audio-visual control equipment.

8. The tool of claim 7, wherein
   a. said user interface receives:
      i. an indication that project creation has been initiated by a user;
      ii. said selection of a venue template from said plurality of user-selectable said templates corresponding to a respective plurality of types of venues for audio-visual and audio-visual control installations;
      iii. user responses to computer generated questions regarding top-level installation specifications;
      iv. a user-selected category of products from said plurality of categories;
      v. user responses to questions regarding said selected product category; and
      vi. a selection of said product from said selected product category; and
   b. wherein said tool produces said bill of materials, said cable schedule, said rack layout, said user-editable audio-visual connectivity line schematic, and said ceiling speaker layout.

* * * * *